US012785486B2

(12) United States Patent
Peng et al.

(10) Patent No.: US 12,785,486 B2
(45) Date of Patent: Nov. 3, 2026

(54) VEHICLE ELECTRIC MOTOR INCLUDING DUAL-WINDING CONFIGURATION

(71) Applicant: GM GLOBAL TECHNOLOGY OPERATIONS LLC, Detroit, MI (US)

(72) Inventors: Peng Peng, Columbus, OH (US); Lei Hao, Troy, MI (US); Suresh Gopalakrishnan, Troy, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 18/643,439

(22) Filed: Apr. 23, 2024

(65) Prior Publication Data

US 2025/0330055 A1 Oct. 23, 2025

(51) Int. Cl.

| | |
|---|---|
| ***H02P 25/18*** | (2006.01) |
| ***H02K 1/16*** | (2006.01) |
| ***H02K 3/12*** | (2006.01) |
| ***H02K 3/28*** | (2006.01) |
| ***H02P 25/22*** | (2006.01) |
| ***H02P 27/08*** | (2006.01) |

(52) U.S. Cl.

CPC ............... *H02K 3/28* (2013.01); *H02K 1/165* (2013.01); *H02K 3/12* (2013.01); *H02P 25/22* (2013.01); *H02P 27/08* (2013.01)

(58) Field of Classification Search

CPC ............ H02K 3/28; H02K 1/165; H02K 3/12; H02K 1/146; H02K 3/50; H02K 3/522; H02K 2213/03; H02P 25/22; H02P 27/08

See application file for complete search history.

(56) References Cited

U.S. PATENT DOCUMENTS

| | | | | |
|---|---|---|---|---|
| 2018/0351482 | A1* | 12/2018 | Kanazawa | H02P 25/18 |
| 2023/0024531 | A1* | 1/2023 | Gerber | H02K 3/12 |
| 2024/0079935 | A1 | 3/2024 | Nishimura | |

FOREIGN PATENT DOCUMENTS

| | | | |
|---|---|---|---|
| DE | 102018101830 | A1 | 8/2018 |
| DE | 102020201547 | A1 | 8/2021 |

(Continued)

OTHER PUBLICATIONS

U.S. Appl. No. 18/582,833, filed Feb. 21, 2024, Peng et al.

(Continued)

*Primary Examiner* — Muhammad S Islam

(57) ABSTRACT

A dual-winding electric motor for an electric vehicle includes a stator core including multiple teeth, multiple slots defined between the multiple teeth, a first set of stator windings wound in a first portion of the multiple slots, a second set of stator windings wound in a second portion of the multiple slots, and a control module is configured to supply a first pulse-width-modulation (PWM) signal to the first set of stator windings and a second PWM signal to the second set of stator windings. The first PWM signal has a different phase than the second PWM signal and the dual-winding electric motor operates according to PWM interleaving, and the first portion of the multiple teeth having the first set of stator windings is spatially separated from the second portion of the multiple teeth having the second set of stator windings.

18 Claims, 6 Drawing Sheets

(56) References Cited

FOREIGN PATENT DOCUMENTS

| | | | |
|---|---|---|---|
| DE | 102022103770 | A1 | 8/2023 |
| JP | 2023013146 | A | 1/2023 |

OTHER PUBLICATIONS

U.S. Appl. No. 18/527,514, filed Dec. 4, 2023, Peng et al.
U.S. Appl. No. 18/320,449, filed May 19, 2023, Peng et al.
U.S. Appl. No. 18/355,717, filed Jul. 20, 2023, Peng et al.
U.S. Appl. No. 18/334,634, filed Jun. 14, 2023, Peng et al.
U.S. Appl. No. 18/160,197, filed Jan. 26, 2023, Hao et al.
German Office Action from counterpart DE1020241152869, dated Mar. 31, 2025.
Hsu, Hsung-Hao et al. "FPGA Control and Implementation of a Multiphase-Interleaved PWM Inverter for a Segmented PMSM", 2015 IEEE 11th International Conference on Power Electronics and Drive Systems, Sydney, NSW, Australia, 2015, pp. 224-230, doi: 10.1109/PEDS.2015.7203410.
German Summons from counterpart DE1020241152869, dated Feb. 4, 2026.

* cited by examiner

VEHICLE ELECTRIC MOTOR INCLUDING DUAL-WINDING CONFIGURATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to electric motors for vehicles, including dual-winding configurations for the electric motors.

Electric vehicles have electric motors which are at least partially powered via vehicle battery cells. Dual-winding three-phase electric machines which have their two windings strongly electromagnetically coupled, may cause severe circulating current and a large amount of current harmonics during interleaved pulse-width-modulation (PWM) control, significantly undermining the controllability, efficiency, and noise, vibration and harshness (NVH) power factor of the electric drive system.

SUMMARY

A dual-winding electric motor for an electric vehicle includes a stator core including multiple teeth extending radially inward from an inner diameter of the stator core, wherein multiple slots are defined between the multiple teeth, a first set of stator windings wound in a first portion of the multiple slots about a first portion of the multiple teeth, a second set of stator windings wound in a second portion of the multiple slots about a second portion of the multiple teeth, and a control module is configured to supply a first pulse-width-modulation (PWM) signal to the first set of stator windings and a second PWM signal to the second set of stator windings, wherein the first PWM signal has a different phase than the second PWM signal and the dual-winding electric motor operates according to PWM interleaving, and wherein the first portion of the multiple teeth having the first set of stator windings is spatially separated from the second portion of the multiple teeth having the second set of stator windings.

In some examples, the first set of stator windings is arranged in a different pole pair of the dual-winding electric motor than the second set of stator windings. In some examples, the first set of stator windings is arranged in a first pole pair and a third pole pair of the dual-winding electric motor, and the second set of stator windings is arranged in a second pole pair and a fourth pole pair of the dual-winding electric motor.

In some examples, the multiple teeth are spatially arranged in four quadrants which do not overlap one another, the first set of stator windings is located in a first quadrant of the four quadrants and a third quadrant of the four quadrants, and the second set of stator windings is located in a second quadrant of the four quadrants and a fourth quadrant of the four quadrants.

In some examples, the second quadrant is located between the first quadrant and the third quadrant along a circumference of the stator core, and the third quadrant is located between the second quadrant and the fourth quadrant along the circumference of the stator core.

In some examples, first PWM signal and the second PWM signal are each three-phase PWM signals. In some examples, the first set of stator windings is electromagnetically isolated from the second set of stator windings to inhibit circulating current and current harmonics due to the PWM interleaving.

In some examples, the motor includes a third set of stator windings wound in a third portion of the multiple slots about a third portion of the multiple teeth, wherein the third portion of the multiple teeth having the third set of stator windings is spatially separated from the first portion of the multiple teeth having the first set of and the second portion of the multiple teeth having the second set of windings.

In some examples, the first set of stator windings is arranged in a first pole pair of the dual-winding electric motor, the second set of stator windings is arranged in a second pole pair of the dual-winding electric motor, and the third set of stator windings is arranged in a third pole pair of the dual-winding electric motor.

In some examples, a frequency of the first PWM signal and the second PWM signal is at least five kilohertz. In some examples, the frequency of the first PWM signal and the second PWM signal is less than or equal to twenty kilohertz. In some examples, the frequency of the first PWM signal and the second PWM signal is ten kilohertz.

In some examples, the control module includes at least one inverter configured to supply the first PWM signal to the first set of stator windings and the second PWM signal to the second set of stator windings.

A dual-winding electric motor for an electric vehicle includes a stator core including multiple teeth extending radially inward from an inner diameter of the stator core, wherein multiple slots are defined between the multiple teeth, a first set of stator windings wound in a first portion of the multiple slots about a first portion of the multiple teeth, a second set of stator windings wound in a second portion of the multiple slots about a second portion of the multiple teeth, and a control module is configured to supply a first pulse-width-modulation (PWM) signal to the first set of stator windings and a second PWM signal to the second set of stator windings, wherein the first PWM signal has a different phase than the second PWM signal and the dual-winding electric motor operates according to PWM interleaving, and wherein the first set of stator windings is arranged in a different pole pair of the dual-winding electric motor than the second set of stator windings.

In some examples, the first set of stator windings is arranged in a first pole pair and a third pole pair of the dual-winding electric motor, and the second set of stator windings is arranged in a second pole pair and a fourth pole pair of the dual-winding electric motor.

In some examples, the multiple teeth are spatially arranged in four quadrants which do not overlap one another, the first set of stator windings is located in a first quadrant of the four quadrants and a third quadrant of the four quadrants, and the second set of stator windings is located in a second quadrant of the four quadrants and a fourth quadrant of the four quadrants.

In some examples, the second quadrant is located between the first quadrant and the third quadrant along a circumference of the stator core, and the third quadrant is located between the second quadrant and the fourth quadrant along the circumference of the stator core.

In some examples, first PWM signal and the second PWM signal are each three-phase PWM signals. In some examples, the first set of stator windings is electromagnetically isolated from the second set of stator windings to inhibit circulating current and current harmonics due to the PWM interleaving.

In some examples, the motor includes a third set of stator windings wound in a third portion of the multiple slots about a third portion of the multiple teeth, wherein the third portion of the multiple teeth having the third set of stator windings is spatially separated from the first portion of the multiple teeth having the first set of and the second portion of the multiple teeth having the second set of windings.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Electric vehicles have electric motors which may be driven by interleaved PWM control in a dual-winding configuration, such as a three-phase dual winding arrangement of two sets of stator windings. Dual-winding three-phase electric machines which have their two windings strongly electromagnetically coupled may experience circulating current and current harmonics during interleaved PWM control, which may reduce controllability and efficiency of the drive system for the electric vehicle motor.

In some example embodiments, an electric motor includes a dual-winding configuration where two windings of the motor are spatially separated and electromagnetically isolated. Excitations in the two windings do not interfere with oner another, which may inhibit or prevent circulating current, and reduce or eliminate current harmonics caused by electromagnetic coupling between the windings. This improves the benefits of interleaved pulse-width-modulation (PWM) control for the dual-winding configuration, such as lower current ripple, lower torque ripple, lower capacitor current, higher efficiency, etc.

A dual-winding electric machine may include two sets of stator windings which are spatially separated. For example, the two windings may not exist in the same pole pair, such that the two sets of stator windings are nearly electromagnetically isolated. Use of nearly electromagnetically isolated stator windings effectively avoids circulating current, and reduces or eliminates current harmonics, due to PWM interleaving.

For an electric machine with an even number of pole pairs, such as four pole pairs for example, a first stator winding may cover pole pairs 1 and 3, and a second stator winding may cover pole pairs 2 and 4. For electric machines with an odd number of pole pairs, such as three pole pairs for example, three sets of windings (e.g., inverters) may be used to cover each of the pole pairs.

In some example embodiments, two sets of stator windings may be essentially decoupled, due to spatial separation of the two sets of stator windings to different portions of the stator (e.g., the two sets or stator windings are wound about teeth of the stator in different spatial sections of the stator). Power may be supplied to the sets of stator windings using PWM interleaving, where weak electromagnetic coupling achieves an equivalent effect to a single-winding drive with a higher switching frequency (e.g., a 10-kHz dual-winding interleaved PWM drive may achieve an equivalent effect as a 15-kHz single-winding drive). In some examples, an electric drive may have a switching frequency in a range from 5 kHz to 20 KHz (e.g., about 10 kHz). The switching frequency may vary depending on speed and torque for an EV motor.

Figure 1:
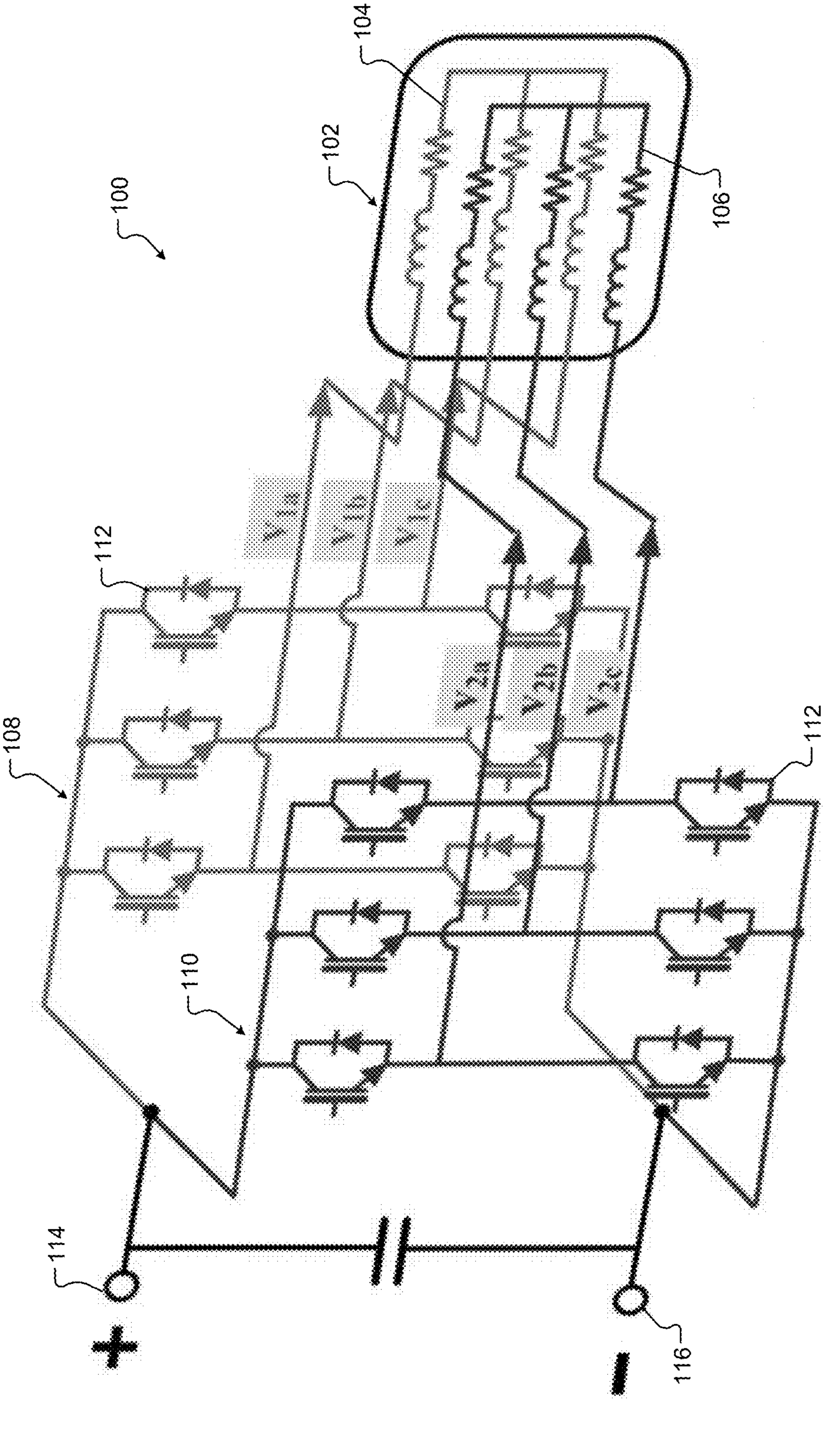
FIG. 1 is a circuit diagram of an example circuit for powering an electric vehicle motor having a three-phase dual-winding configuration.

FIG. 1 is a circuit diagram of an example circuit 100 for powering an electric machine 102, such as an electric vehicle motor, having a three-phase dual-winding configuration. The dual-winding configuration includes a first set of windings 104 and a second set of windings 106.

In some examples, the first set of windings 104 and the second set of windings 106 are spatially separated within the electric machine 102. For example, the first set of windings 104 may be a set of stator windings wound about a first portion of stator teeth of the electric machine 102, and the second set of windings 106 may be wound about a second portion of stator teeth of the electric machine 102, where the first and second portions are at different special locations of the electric machine 102.

The circuit 100 may receive a power input from a direct current (DC) power source, such as a battery module for an electric vehicle. The circuit 100 includes a positive input terminal 114 configured to be electrically coupled with the power source, and a negative input terminal 116 configured to be electrically coupled with the power source.

As shown in FIG. 1, the circuit 100 may include multiple inverters. For example, a first inverter 108 is electrically coupled between the first set of windings 104 and the input terminals, and a second inverter 110 is electrically coupled between the second set of windings 106 and the input terminals.

The first inverter 108 and the second inverter 110 may each include multiple switches 112, to generate alternating current in the first set of windings 104 and the second set of windings 106, respectively. For example, the first inverter 108 may include six switches 112 to generate three phases of power for the first set of windings 104, corresponding to input voltages V1a, V1b and Vic. The second inverter 110 may include six switches 112 to generate three phases of power for the second set of windings 106, corresponding to input voltages V2a, V2b and V2c. In other examples, more or less inverters may be used, other topologies of inverters may be used (such as a multi-level inverter) with more or less switches, etc.

In some examples, the dual-winding configuration with multiple inverters may reduce or eliminate a need for onboard power transfer modules (e.g., on an electric vehicle), which may provide significant cost savings per vehicle. The dual-winding configuration may enhance fault tolerance, and enable PWM interleaving, which may reduce winding current ripple, reduce capacitor current, reduce torque ripple, improve noise, vibration and harshness (NVH), improve efficiency, etc.

The first inverter 108 and the second inverter 110 are not directly connected in dual-winding arrangement. If there is a voltage difference between the first inverter 108 and the second inverter 110, electrical coupling between windings of the first set of windings 104 and the second set of windings 106 may cause large current harmonic issues.

Figure 2:
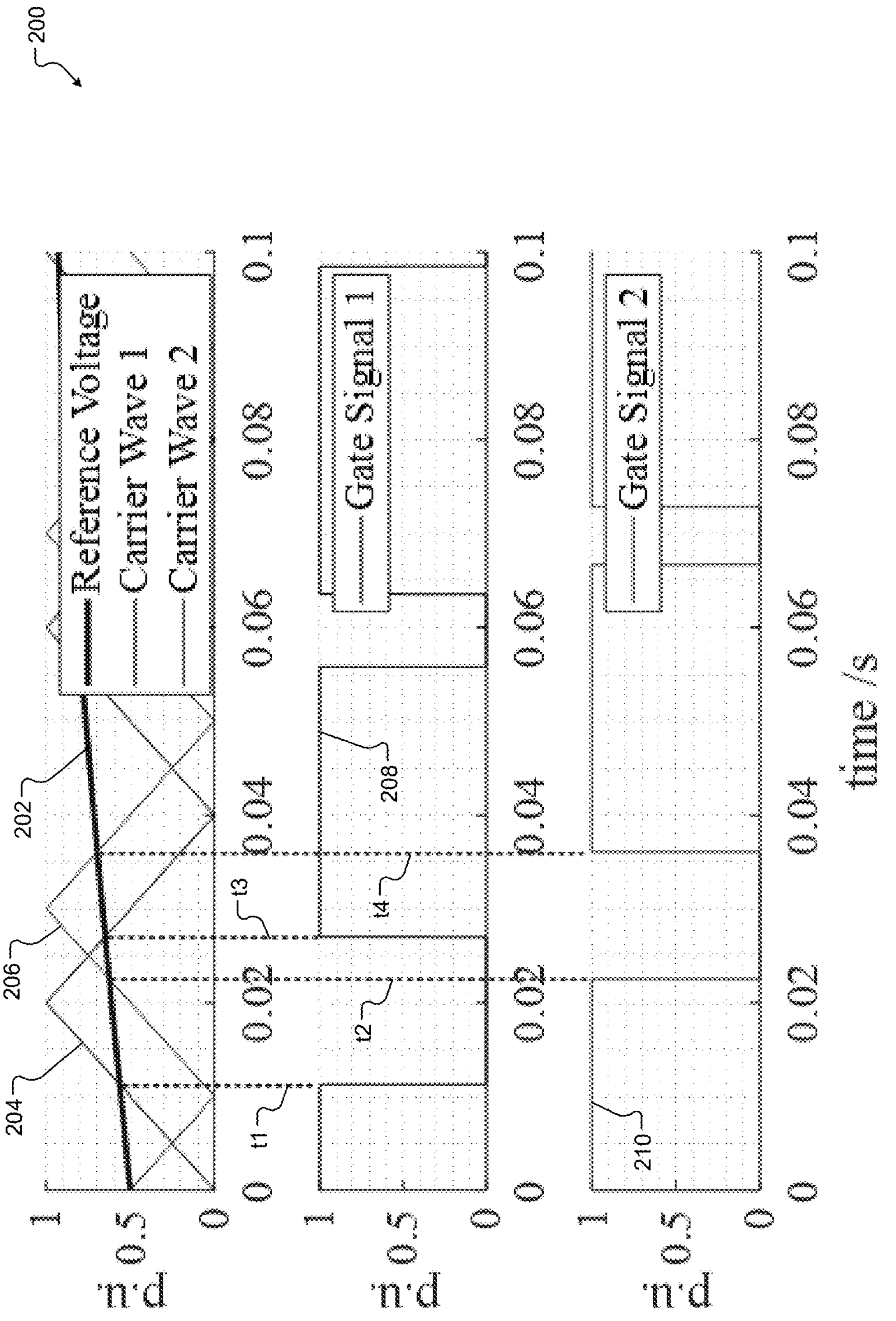
FIG. 2 is a line graph illustrating example pulse-width-modulation control signals for an electric vehicle motor having a three-phase dual-winding configuration.

FIG. 2 is a line graph illustrating example pulse-width-modulation control signals 200 for an electric vehicle motor having a three-phase dual-winding configuration. During PWM interleaving, the voltage input from two inverters (e.g., the first inverter 108 and the second inverter 110), may be misaligned. If there is a voltage differential between the two inverters and strong electromagnetic coupling between two sets of windings, there may be severe circulating current and large amounts of current harmonics.

FIG. 2 illustrates a first carrier wave 204 corresponding to a first PWM signal 208 for a first inverter (e.g., the first inverter 108 of FIG. 1), and a second carrier wave 206 corresponding to a second PWM signal 210 for a second inverter (e.g., the second inverter 110 of FIG. 1).

The first carrier wave 204 and the second carrier wave 206 may overlap if they were not interleaved. FIG. 2 illustrates the first carrier wave 204 and the second carrier wave offset from one another via interleaving, where the reference voltage 202 causes the first PWM signal 208 and the second PWM signal 210 to be high at different times. For example, the first carrier wave 204 is higher than the reference voltage 202 at different times than the second carrier wave 206, so the first PWM signal 208 is high at different times than the second PWM signal 210.

The angle shift between two carrier waves can shift depending on need. A ninety degree shift may work best for many cases, but other shifts may be used in other situations. A carrier wave angle shift may be considered as an angle between two different PWM carrier waveforms, for example.

A motor winding angle shift may be considered as a physical angle between two motor windings. Some electric machines may use a 0-degree shifted dual-winding configuration, a 30-deg shifted dual-winding configuration, or a 60-degree shifted dual-winding configuration. Large amounts of high-frequency current harmonics may be observed at different phase shifts, if two sets of windings are not spatially separated from one another. Current harmonics may complicate control of the electric machine, and worsen the drive efficiency.

In some example embodiments, such as a single three-phase winding, the winding may spatially cover four pole pairs of the electric machine, e.g., all pole pairs. In other examples, such as a 30-deg-shifted dual-winding three-phase configuration, the first winding and the second winding may spatially cover four pole pairs (e.g., all pole pairs) of the electric machine. Therefore, the two windings may be electromagnetically coupled. Some example embodiments described herein may use spatial separation between windings to reduce or eliminate electromagnetic coupling between two sets of windings (e.g., two sets of windings of a stator of an electric vehicle motor).

Figure 3:
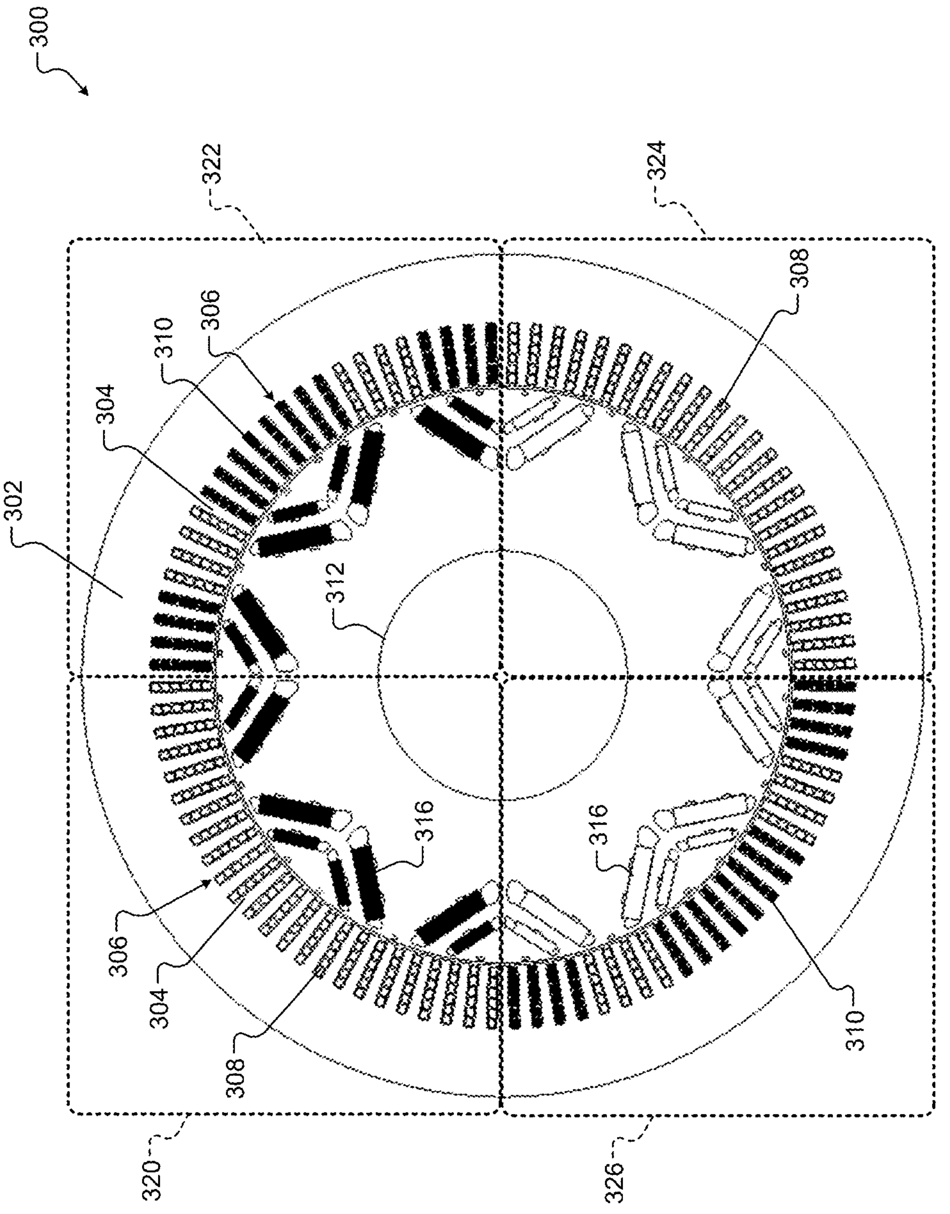
FIG. 3 is a front view of an example electric vehicle motor having a three-phase dual-winding configuration.

FIG. 3 is a front view of an example electric vehicle motor 300 having a three-phase dual-winding configuration. The electric vehicle motor 300 includes a stator core 302 including multiple teeth 304. The multiple teeth 304 extend radially inward from an inner diameter of the stator core 302. For example, the electric vehicle motor 300 may include a rotor 312 position in a center of the stator core 302, and the multiple teeth 304 may extend towards the rotor 312. The electric vehicle motor 300 may also include any other suitable motor features, such as magnets 316 for proper motor operation, etc.

The multiple teeth 304 define multiple slots 306 between the teeth. For example, a slot may be defined between two adjacent ones of the multiple teeth 304. In some examples, a first set of stator windings 308 is wound in a first portion of the multiple slots 306 about a first portion of the multiple teeth 304. A second set of stator windings 310 is wound in a second portion of the multiple slots 306 about a second portion of the multiple teeth 304.

A control module (e.g., the control module 402 of FIGS. 4A and 4B) is configured to supply a first pulse-width-modulation (PWM) signal to the first set of stator windings 308, and a second PWM signal to the second set of stator windings 310. The first PWM signal has a different phase than the second PWM signal (e.g., as shown by the first PWM signal 208 and the second PWM signal 210 in FIG. 2), and the electric vehicle motor 300 operates according to PWM interleaving.

As shown in FIG. 3, the first portion of the multiple teeth 304 having the first set of stator windings 308 is spatially separated from the second portion of the multiple teeth 304 having the second set of stator windings 310. In some examples, the first set of stator windings 308 is arranged in a different pole pair of the dual-winding electric motor than the second set of stator windings 310. For example, the first set of stator windings 308 may be arranged in a first pole pair and a third pole pair of the dual-winding electric motor, and the second set of stator windings 310 may be arranged in a second pole pair and a fourth pole pair of the dual-winding electric motor.

The multiple teeth 304 may be spatially arranged in, for example, four quadrants which do not overlap one another, as shown in FIG. 3. The first set of stator windings 308 is located in a first quadrant 320 and a third quadrant 324 (e.g., the first set of stator windings 308 is wound about teeth 304 located only in the first quadrant 320 and the third quadrant 324). The second set of stator windings 310 is located in a second quadrant 322 and a fourth quadrant 326 (e.g., the second set of stator windings 310 is wound about teeth 304 located only in the second quadrant 322 and the fourth quadrant 326).

The quadrants are arranged to keep the first set of stator windings 308 and the second set of stator windings 310 spatially separated. For example, the second quadrant 322 is located between the first quadrant 320 and the third quadrant 324 along a circumference of the stator core 302. The third quadrant 324 is located between the second quadrant 322 and the fourth quadrant 326 along the circumference of the stator core 302.

In some examples, the first set of stator windings 308 is electromagnetically isolated from the second set of stator windings 310 to inhibit circulating current and current harmonics due to the PWM interleaving. The control module may supply a three-phase signal to each of the first set of stator windings 308 and the second set of stator windings 310, and each of the first set of stator windings 308 and the second set of stator windings 310 may be wound about respective portions of the stator core 302 in respective three-phase winding configurations.

Although FIG. 3 illustrates two sets of stator windings, other embodiments may include different numbers of stator windings, such as three sets of stator windings. For example, a third set of stator windings may be wound in a third portion of the multiple slots about a third portion of the multiple teeth, wherein the third portion of the multiple teeth having the third set of stator windings is spatially separated from the first portion of the multiple teeth having the first set of and the second portion of the multiple teeth having the second set of windings. In this example, the first set of stator windings may be arranged in a first pole pair of the dual-winding electric motor, the second set of stator windings may be arranged in a second pole pair of the dual-winding electric motor, and the third set of stator windings may be arranged in a third pole pair of the dual-winding electric motor.

The example stator core 302 illustrated in FIG. 3 includes 96 stator slots, which cover a range from 0 to 360 mechanical degrees. Each winding may cover the entire 360 mechanical degrees of the stator core 302. Different winding patterns between the multiple slots 306 may be used in different embodiments, and other example stator cores may include more or less slots.

Figure 4A:
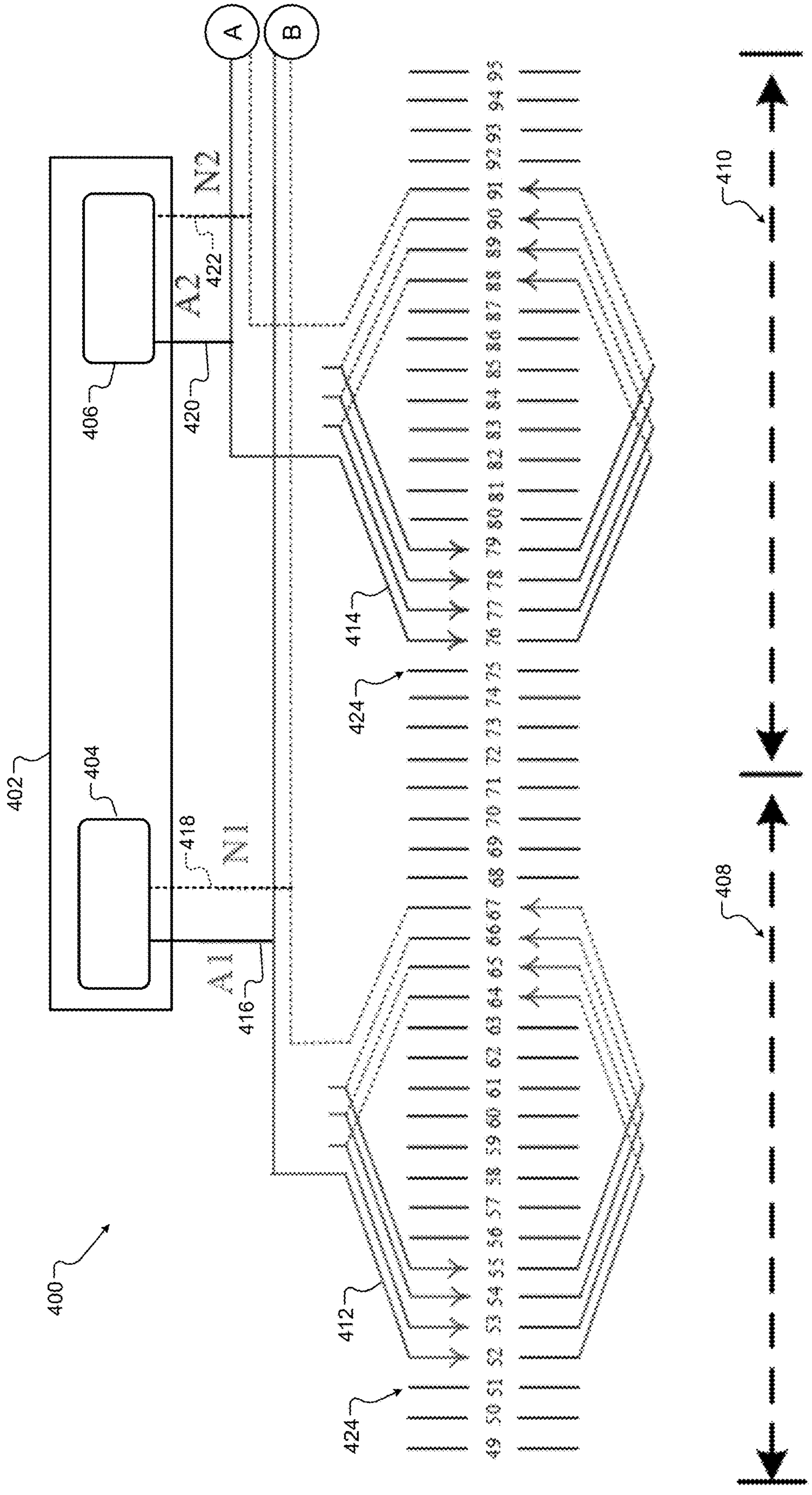
FIGS. 4A and 4B are line diagrams illustrating an example winding pattern for two sets of stator windings of an electric vehicle motor having a three-phase dual-winding configuration.
Figure 4B:
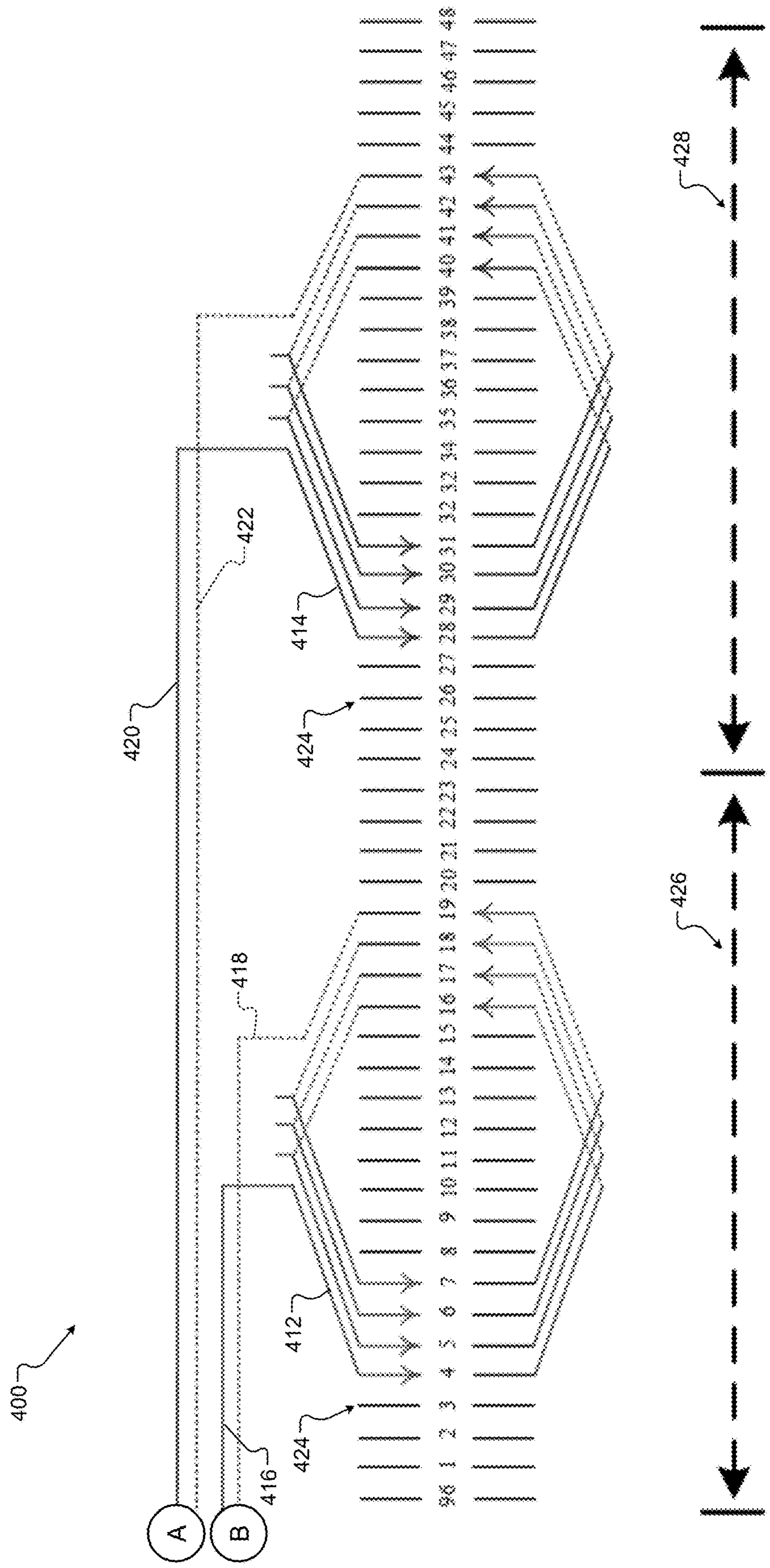

FIGS. 4A and 4B are line diagrams illustrating an example winding pattern 400 for two sets of stator windings of an electric vehicle motor having a three-phase dual-winding configuration. In some examples, a dual-3-phase (i.e., 6-phase) winding configuration has its two 3-phase windings spatially separated, and the two windings are therefore nearly electromagnetically isolated. Excitations in the two windings may not interfere with each other.

The example illustrated in FIGS. 4A and 4B is a four pole pair machine. In a three pole pair machine of other examples, three winding sets may be used with three inverters (each arranged in their own 120 mechanical degrees section of the stator core).

FIGS. 4A and 4B illustrate a stator core having 96 slots 424, where a first set of windings 412 receives a signal from a first inverter 404 of a control module 402 (e.g., a vehicle control module), and a second set of windings 414 receives a signal from a second inverter 406 of the control module 402. For example, the first set of windings 412 is connected to a positive terminal 416 of the first inverter 404 and a negative terminal 418 of the first inverter 404. The second set of windings 414 is connected to a positive terminal 420 of the second inverter 406 and a negative terminal 422 of the second inverter 406.

The first set of windings 412 is wound through slots 424 which spatially correspond to a first pole pair 408 and a third pole pair 426. The second set of windings 414 is wound through slots which spatially correspond to a second pole pair 410 and a fourth pole pair 428.

Figure 5:
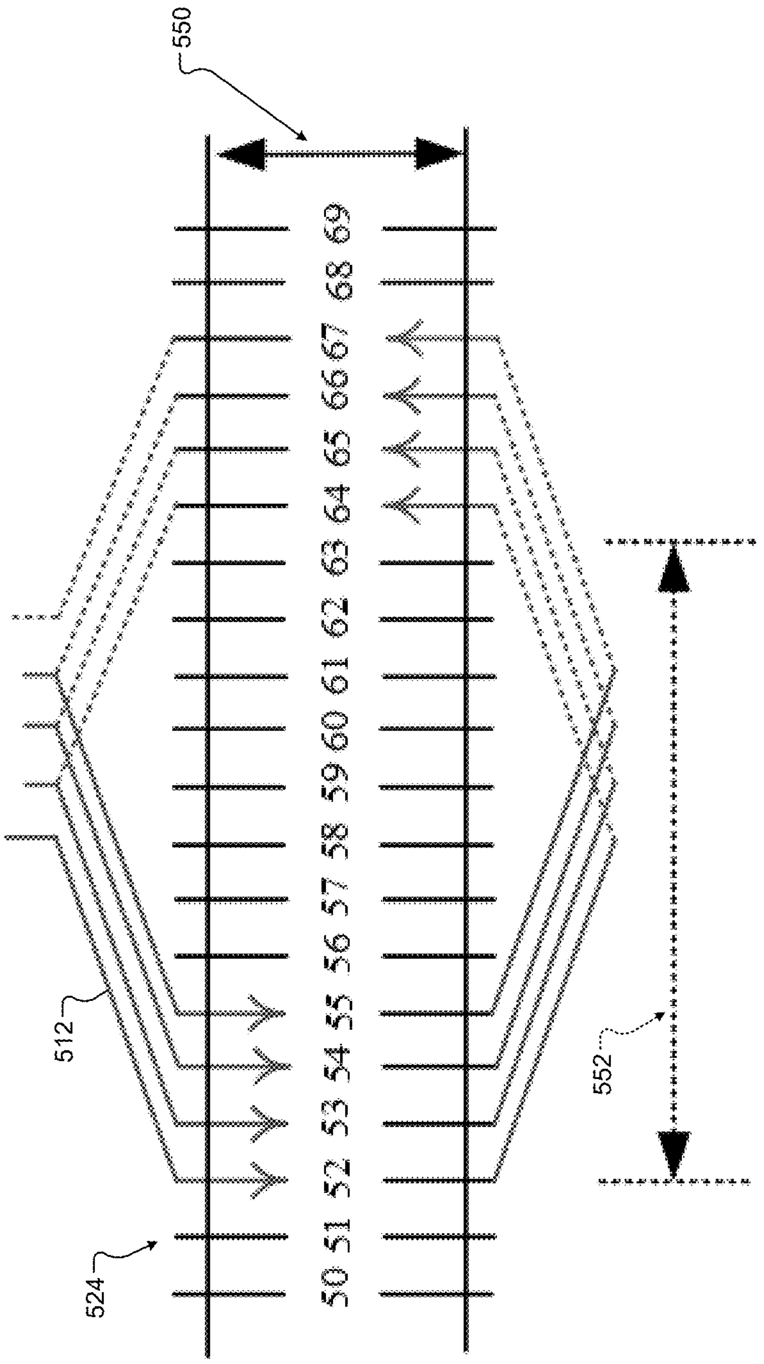
FIG. 5 is an example line diagram of an example winding pattern for a stator winding having a reduced pole pitch.

FIG. 5 is an example line diagram of an example winding pattern 500 for a stator winding having a reduced pole pitch 552. For example, a set of windings 512 may be wound through slots 524 corresponding to a first pole of the motor. The motor may have a stack length 550 and a pole pitch 552 as shown in FIG. 5.

Pole pitch is a distance between windings (e.g., a number of slots between adjacent half pole pairs). A shorter pole pitch may result in a shorter end winding (e.g., copper connections outside of the winding, which do not contribute to motor propulsion). In the example of FIG. 4, a pole pitch of 552 having a value of 11.25 may reduce end winding resistance.

In some examples, a dual winding configuration with spatial separation may have a reduced pole pitch of 11.25 (e.g., as compared to a pole pitch of 12 in a single winding configuration), which may provide improved winding parameter values (such as a 4.6% reduction in end winding resistance).

While some example winding configurations may have two windings which are magnetically coupled based on d-axis flux and q-axis flux (such as a 0-degree dual winding configuration, a 30-degree dual winding configuration, and a 60-degree dual winding configuration), example embodiments with spatially separated windings as described herein may include windings which are nearly electromagnetically isolated. For example, spatially separated windings may be magnetically decoupled according to d-axis flux and q-axis flux.

In some example winding configurations, such as a 30-deg shifted dual three-phase winding configuration where the windings are not spatially separated, high-order current harmonics may exist during PWM-interleaved control due to circulating current caused by strong winding coupling (e.g., based on current in a frequency domain of 0-30 kHz). High 5th and 7th-order harmonics may exist due to the nature of a dual-winding machine with an angle shift (e.g., based on current in a frequency domain of 0-20 harmonic orders).

In some example winding configurations described herein, such as a dual three-phase winding configuration where the two windings are spatially separated, there may be very few high-order harmonics due to reduction or elimination of circulating currents based on the electromagnetic isolation between the sets of windings (e.g., based on current in a frequency domain of 0-30 kHz). There may be very few low-order harmonics due to no angle shift between the two windings (e.g., based on current in a frequency domain of 0-20 harmonic orders). The spatially separated sets of windings may avoid circulating current and reduce or eliminate high-frequency and low-frequency harmonics.

For example, a dual-winding configuration with spatial separation may reduce magnet loss by 29% compared to a winding configuration without spatial separation, may reduce copper loss by 8.2%, may reduce energy loss by 8.05%, etc.

As mentioned above, some example dual-winding configurations may be implemented to drive a motor of an electric vehicle. For example, a vehicle includes front wheels and rear wheels, where a drive unit selectively outputs torque to the front wheels and/or the rear wheels via drive lines. The vehicle may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit may include any suitable electric motor, a power inverter, and a motor controller configured to control power switches within the power inverter to adjust the motor speed and torque during propulsion and/or regeneration. A battery system provides power to or receives power from the electric motor of the drive unit via the power inverter during propulsion or regeneration.

For example, the battery pack may include multiple rechargeable vehicle battery modules configured to supply power to the drive unit. Each battery module may include one or more rechargeable battery cells (e.g., lithium battery cells), which may be connected with one another in series or in parallel. The battery pack may provide one or more voltage outputs for powering different components of the vehicle, such as a low voltage (LV) output (e.g., 3.3 volts, 5 volts, 12, volts, etc.), a high voltage (HV) output (e.g., 48 volts, 96 volts, 200 volts, 300 volts, 400 volts, etc.), or other suitable voltage values (e.g., 24 volts, etc.).

The vehicle may have a single driver unit, or multiple drive units. For example, two separate drive units may drive the front wheels and the rear wheels, one or more individual drive units may drive individual wheels, etc. As can be appreciated, other vehicle configurations and/or drive units can be used.

A vehicle control module may be configured to control operation of one or more vehicle components, such as the drive unit (e.g., by commanding torque settings of an electric motor of the drive unit). The vehicle control module may receive inputs for controlling components of the vehicle, such as signals received from a steering wheel, an acceleration pedal, a brake pedal, etc. The vehicle control module may monitor telematics of the vehicle for safety purposes, such as vehicle speed, vehicle location, vehicle braking and acceleration, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A dual-winding electric motor for an electric vehicle, the dual-winding electric motor comprising:

a stator core including multiple teeth extending radially inward from an inner diameter of the stator core, wherein the multiple teeth are spatially arranged in a total of four quadrants of the stator core which do not overlap each other, wherein multiple slots are defined between the multiple teeth;

a first set of stator windings wound in a first portion of the multiple slots about a first portion of the multiple teeth;

a second set of stator windings wound in a second portion of the multiple slots about a second portion of the multiple teeth; and a control module is configured to supply a first pulse-width-modulation (PWM) signal to the first set of stator windings and a second PWM signal to the second set of stator windings, wherein the first PWM signal has a different carrier phase shift than the second PWM signal and the dual-winding electric motor is configured to operate according to PWM interleaving, and wherein the first portion of the multiple teeth having the first set of stator windings is spatially separated from the second portion of the multiple teeth having the second set of stator windings with the first set of stator windings located only in a first one and a third one of the four quadrants of the stator core, and the second set of stator windings located only in a second one and a fourth one of the four quadrants of the stator windings.

2. The dual-winding electric motor of claim 1, wherein the first set of stator windings is arranged in a different pole pair of the dual-winding electric motor than the second set of stator windings.

3. The dual-winding electric motor of claim 1, wherein:

the second quadrant is located between the first quadrant and the third quadrant along a circumference of the stator core; and the third quadrant is located between the second quadrant and the fourth quadrant along the circumference of the stator core.

4. The dual-winding electric motor of claim 1, wherein the first PWM signal and the second PWM signal are each three-phase PWM signals.

5. The dual-winding electric motor of claim 1, wherein the first set of stator windings is electromagnetically isolated from the second set of stator windings to inhibit circulating current and current harmonics due to the PWM interleaving.

6. A multi-winding electric motor including the electric motor of claim 1, further comprising a third set of stator windings wound in a third portion of the multiple slots about a third portion of the multiple teeth, wherein the third portion of the multiple teeth having the third set of stator windings is spatially separated from the first portion of the multiple teeth having the first set of and the second portion of the multiple teeth having the second set of windings.

7. The dual-winding electric motor of claim 1, wherein a frequency of the first PWM signal and the second PWM signal is at least five kilohertz.

8. The dual-winding electric motor of claim 1, wherein the control module includes at least one inverter configured to supply the first PWM signal to the first set of stator windings and the second PWM signal to the second set of stator windings.

9. The dual-winding electric motor of claim 2, wherein:

the first set of stator windings is arranged in a first pole pair and a third pole pair of the dual-winding electric motor; and the second set of stator windings is arranged in a second pole pair and a fourth pole pair of the dual-winding electric motor.

10. The multi-winding electric motor of claim 8, wherein:

the first set of stator windings is arranged in a first pole pair of the dual-winding electric motor;

the second set of stator windings is arranged in a second pole pair of the dual-winding electric motor; and the third set of stator windings is arranged in a third pole pair of the dual-winding electric motor.

11. The dual-winding electric motor of claim 7, wherein the frequency of the first PWM signal and the second PWM signal is less than or equal to twenty kilohertz.

12. The dual-winding electric motor of claim 11, wherein the frequency of the first PWM signal and the second PWM signal is ten kilohertz.

13. A dual-winding electric motor for an electric vehicle, the dual-winding electric motor comprising:

a stator core including multiple teeth extending radially inward from an inner diameter of the stator core, wherein the multiple teeth are spatially arranged in a total of four quadrants of the stator core which do not overlap each other, wherein multiple slots are defined between the multiple teeth;

a first set of stator windings wound in a first portion of the multiple slots about a first portion of the multiple teeth;

a second set of stator windings wound in a second portion of the multiple slots about a second portion of the multiple teeth; and a control module is configured to supply a first pulse-width-modulation (PWM) signal to the first set of stator windings and a second PWM signal to the second set of stator windings, wherein the first PWM signal has a different carrier phase shift than the second PWM signal and the dual-winding electric motor is configured to operate according to PWM interleaving, and wherein the first set of stator windings is arranged in a different pole pair of the dual-winding electric motor than the second set of stator windings with the first set of stator windings located only in a first one and a third one of the four quadrants of the stator core, and the second set of stator windings located only in a second one and a fourth one of the four quadrants of the stator windings.

14. The dual-winding electric motor of claim 13, wherein:

the first set of stator windings is arranged in a first pole pair and a third pole pair of the dual-winding electric motor; and the second set of stator windings is arranged in a second pole pair and a fourth pole pair of the dual-winding electric motor.

15. The dual-winding electric motor of claim 13, wherein:

the second quadrant is located between the first quadrant and the third quadrant along a circumference of the stator core; and the third quadrant is located between the second quadrant and the fourth quadrant along the circumference of the stator core.

16. The dual-winding electric motor of claim 13, wherein the first PWM signal and the second PWM signal are each three-phase PWM signals.

17. The dual-winding electric motor of claim 13, wherein the first set of stator windings is electromagnetically isolated from the second set of stator windings to Inhibit circulating current and current harmonics due to the PWM interleaving.

18. A multi-winding electric motor including the electric motor of claim 13, further comprising a third set of stator windings wound in a third portion of the multiple slots about a third portion of the multiple teeth, wherein the third portion of the multiple teeth having the third set of stator windings is spatially separated from the first portion of the multiple teeth having the first set of and the second portion of the multiple teeth having the second set of windings.

* * * * *